Sept. 30, 1969 A. E. SERRURE 3,470,498

AUTOMATIC SYSTEM FOR PREVENTING THE USE OF ERRONEOUS PILOT INFORMATION

Filed April 26, 1965 2 Sheets-Sheet 1

United States Patent Office 3,470,498

Patented Sept. 30, 1969

3,470,498
AUTOMATIC SYSTEM FOR PREVENTING THE USE OF ERRONEOUS PILOT INFORMATION

André Emile Serrure, Hove, Belgium, assignor to International Standard Electric Corporation, New York, N.Y., a corporation of Delaware Filed Apr. 26, 1965, Ser. No. 450,954
Claims priority, application Belgium, May 4, 1964, 647,461; Apr. 5, 1965, 662,030
Int. Cl. H04b *3/10*
U.S. Cl. 333—2 12 Claims

ABSTRACT OF THE DISCLOSURE

If the level of the recovered pilot of a carrier cable circuit falls abnormally below that of a neighbouring circuit, the higher level pilot takes over control. This might mean that an abnormal pilot level increase could lead to an undesirable switch-over. The invention proposes to dissociate the amplitude of the control signal, e.g. remote control, from the regulation function by using a variable outband frequency, e.g. from 200 to 220 kc./s. to return the pilot amplitude variations to the slave stations. Thereat, a linear element preferably shifts the range to 5–25 kc./s., with the help of a fixed signal of 225 kc./s. also transmitted from the master station. Pilot borrowing occurs only if the amplitude, before the frequency discriminator, goes beyond a fixed range.

Figures 1, 2:
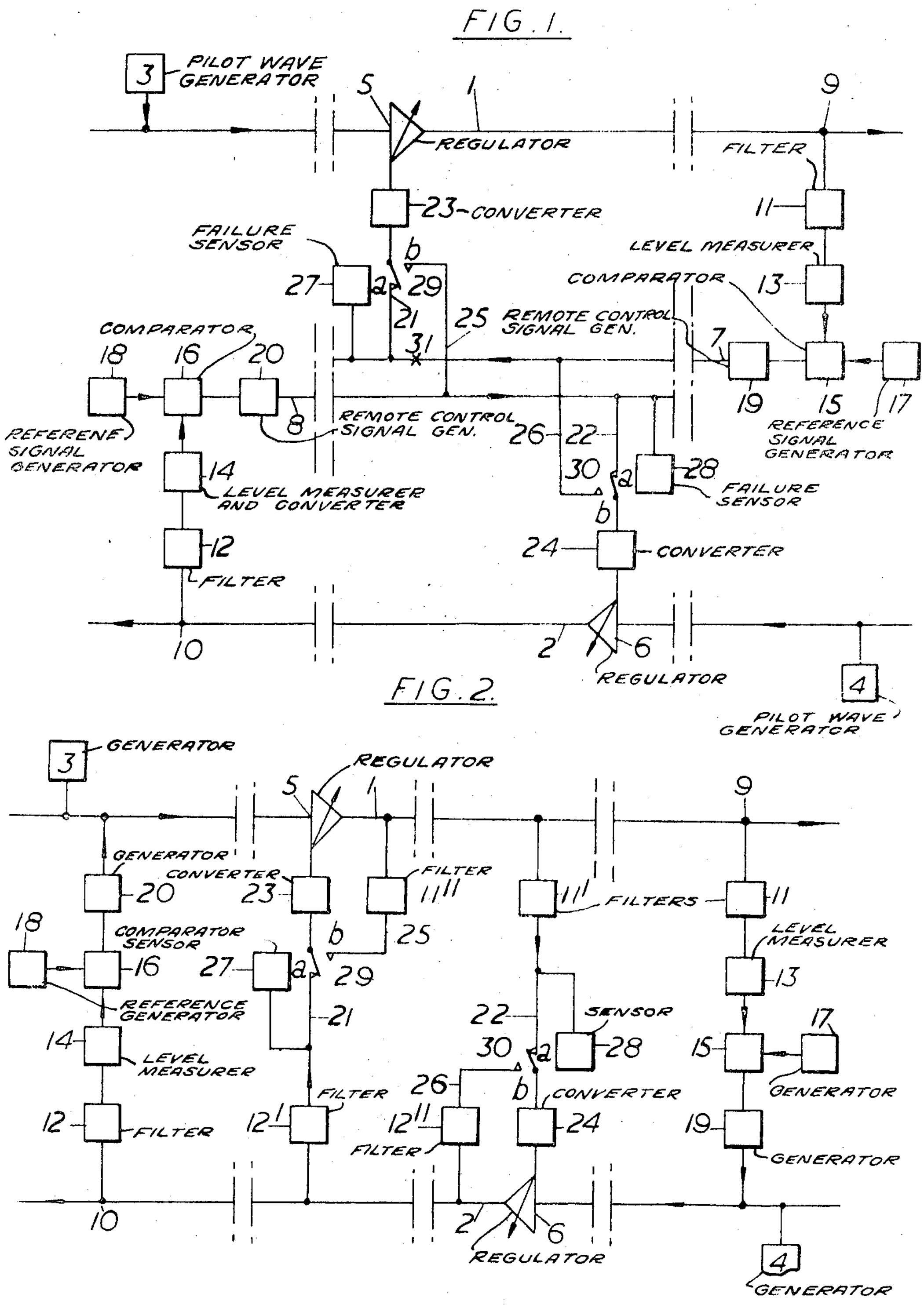

The invention relates to an automatic regulating system for transmission channels over which regulating pilot signals are transmitted and converted at a receiving station into control signals used to command regulating means so as to control the state of said transmission channels.

Such automatic regulating systems are well known, particularly in carrier transmission systems of the frequency division type. They are however subject to breakdowns due to faults in the elements producing and distributing the control signals for the transmission channel regulating means and/or to faults in the elements ensuring transmission of these control signals to remote slave stations, so as to command thereat the regulating means which are inserted in the transmission channels.

In case of failure of a control channel used to convey the control signals derived out of the received regulating pilot information, it is particularly important to avoid a faulty command of a transmission channel which in itself may be in good working order.

Following one aspect of the invention, an object thereof is to provide a novel and improved regulating system of the general type outlined which readily enables the detection of faulty conditions and provides means to remedy these conditions.

In accordance with a characteristic of the invention, a system as initially defined is characterized in that a variable parameter of said control signals distinct from their amplitude is used to express variations of the received regulating pilot signals and to command said regulating means.

In accordance with a further characteristic of the invention, said variable parameter of said control signals is constituted by their frequency.

The conversion of the regulating pilot wave, whose variable amplitude characterizes the traversed transmission channel, into a signal whose amplitude is normally constant, or in any event no longer defines the state or transmission equivalent of the channel, which is now characterized by another parameter of the converted control signal, such as its frequency, is particularly advantageous. Indeed, in general a level variation of the control signal beyond an admissible value can only indicate a control system failure, e.g. an interruption in the command channel associated to a transmission channel, and it is in that case only that it becomes advisable to abandon the control of this channel, which in itself may be in good working order, by the control signal which is assigned thereto.

While the use of a variable frequency for the control signal means that amplitude variations thereof do not command the regulating means, whereby such amplitude variations are exclusively used to control failure detection means which failures are therefore more easily distinguished, there remains the problem of keeping reasonable transmission working conditions until the failure is remedied. In regulating systems using memory devices it is possible to set the regulating means on the value attained just before the breakdown characterized by a control signal of abnormal amplitude, by avoiding further control by such abnormal signals.

Following another aspect of the invention, another object thereof is to provide suitable temporary alternative regulating control during a breakdown, for systems which do not necessarily use slave stations regulating means endowed with memory properties.

This aspect of the invention is based on the insight that in many transmission systems there are at least two distinct transmission channels with distinct control signals, and that these transmission channels usually present substantially equal characteristics while they are subject to like disturbances.

In accordance with another characteristic of the invention an automatic regulating system for at least two transmission channels presenting substantially equal characteristics and subjected to substantially equal disturbances over which regulating pilot signals are transmitted and converted at a receiving station into control signals used to command regulating means so as to control the state of said transmission channels, is characterized in that means are provided to detect a failure of the control signals and that switch-over means controlled by said detection means are provided to command the regulating means of a transmission channel, whose control signals are found to go out of a fixed predetermined range of level values, with the control signals of another transmission channel.

By replacing the normal control signals by those intended for another transmission channel, the substitute control signals are only erroneous in so far as the two transmission channels so associated differ from one another, or in so far as the disturbances to which they may be subjected are different, and it is important to switch over only under appropriate conditions. This shows the advantage of the system now proposed since by using frequency as the regulating parameter for the control signals, it is never the regulating information itself which is used to decide on switch-over, but the abnormal amplitude (with respect to a fixed reference) which indicates that the regulating control signals can no longer be relied upon.

If the frequency $f$ of the control signals can vary between a minimum $f_m$ and a maximum $f_M=f_m+f_d$ about an average frequency $$f_o=\frac{f_m+f_M}{2}$$

a remote control signal transmission system is advantageous if the maximum variation $f_d$ is small with respect to the average frequency $f_o$, i.e. if $f_d/f_o$ is small.

Among other factors, the choice of $f_o$ depends on the characteristics of the remote control channel and the manufacturer may thus be subject to some constraints. In particular, this will be the case when use is made of a return transmission channel to transmit the remote control signal. Indeed, in this case use must be made of a frequency band located— either below the lowest frequency of the transmission system using the transmission channel;
or above the highest frequency;
or within a frequency interval which has been left free, e.g. in carrier telephony, the interval between two secondary or tertiary groups.

The first two solutions present the advantage of not spoiling the transmission channel frequency band, thus enabling various uses of that channel, e.g. alternated telephony or televideo transmissions. Among these two solutions, the first will be more economical if the cost of the filters to be used in each slave station is taken into account (filtering at relatively low frequencies).

The choice of $f_d$ depends not only on the characteristics of the telecommand channel (available bandwidth) but also on the means used to generate the variable frequency $f$. For instance, in the case where the frequency variation is obtained by use of a motor actuated variable air capacitor, $f_d$ is limited by the capacitance variation which can be obtained.

On the other hand, the frequency discriminator or counter which must convert the frequency variations into the actual command signal, e.g. variable current in the heating element of a thermistor, becomes more difficult to build, for a given stability or precision, as $f_d/f_0$ becomes smaller.

Yet a further object of the invention is to avoid to a large extent the constraints indicated above.

In accordance with yet a further characteristic of the invention, in a system as initially defined, the control signals are constituted by variable frequency command signals which are applied to frequency translating means whose output signals command said regulating means.

In accordance with another characteristic of the invention, said frequency translating means produce an output signal whose average frequency is reduced with respect to the average frequency of the original variable frequency control signal.

Although the use of a frequency translation, particularly in a slave station, though it can of course also be applied to the transmitting or receiving stations of the regulating section when regulation means are present thereat, entails an increased flexibility and the elimination of the indicated constraints, frequency translating means using a local frequency necessitate distant feed. The latter implies a supplementary energy consumption. Moreover, the frequency used for this demodulation operation shall have to be controlled if one must avoid differences between the various substations.

Another object of the invention is to eliminate these limitations.

In accordance with another characteristic of the invention, a signal of predetermined frequency is added to the variable frequency control signal.

In accordance with another characteristic of the invention, the signal of predetermined frequency is located outside the frequency range of the variable frequency control signal.

In accordance with another characteristic of the invention, the frequency translating means are constituted by non-linear elements producing the difference frequency between the predetermined frequency and the variable frequency, thereby eliminating the need of a local carrier generator and its inherent technical disadvantages mentioned above, and thereby also reducing the cost.

In this manner, the signal with predetermined frequency serves for the frequency translations in the various slave stations (of course, it may eventually be used in the stations 9, 10 at the end of the regulation section, if regulating means are provided thereat) and can thus be common and be generated in a surface station where power feeding problems do not arise and where a suitably constant frequency can be secured without difficulties.

In accordance with yet another characteristic of the invention, said output signal of the frequency translating means is applied to a frequency discriminator preceded by an amplitude limiter, the frequency discriminator providing the signal for the command of the regulating means, and to the failure detecting means which are connected so as to pick up said output signal before said limiter in order to determine a failure.

Figure 3:
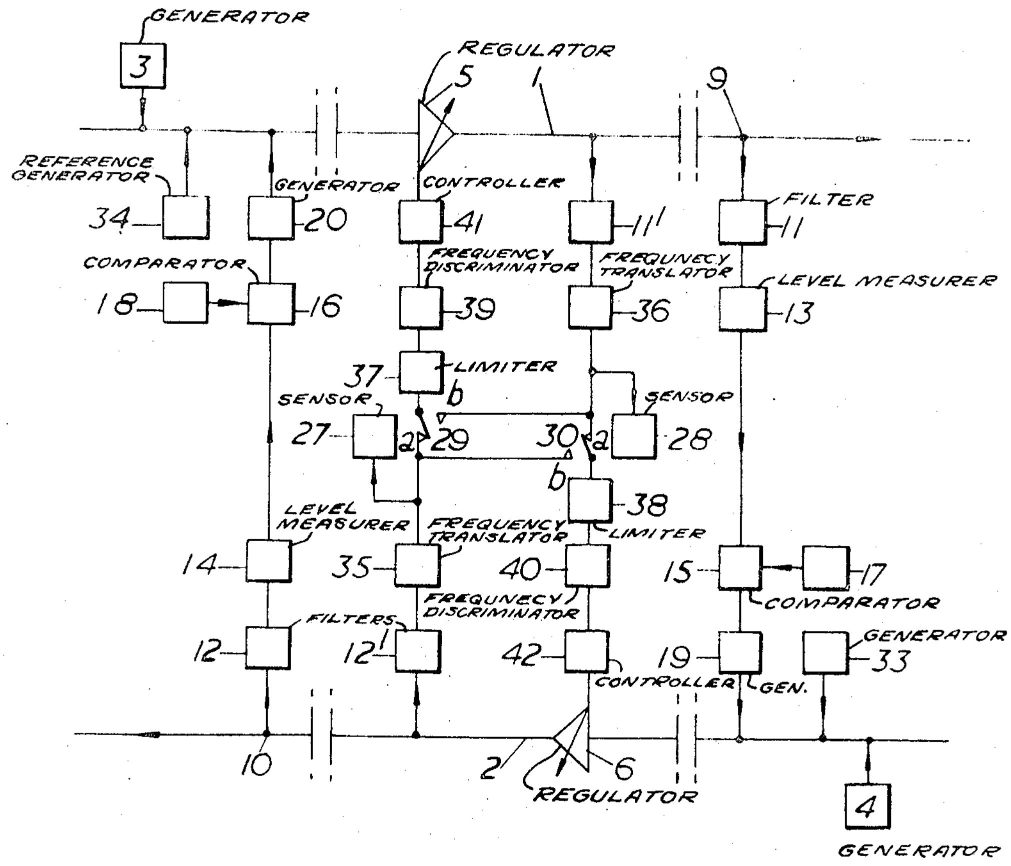

The above and other objects and features of the invention as well as the invention itself will be better understood from the following detailed description of embodiments thereof to be read in conjunction with the accompanying drawings which represent:

FIG. 1, a schematic circuit illustrating the principle of a first embodiment of a regulating system for transmission channels in accordance with the invention, each transmission channel being provided with a control channel physically distinct from the transmission channels;

FIG. 2, a schematic circuit illustrating the principle of a second embodiment of a regulating system in accordance with the invention, in which the control channels coincide physically with the transmission channels; and FIG. 3, a schematic circuit of a third embodiment of a regulating system in accordance with the invention in which a predetermined frequency is added to the variable frequency control signals.

In these figures, the same reference numerals designate analogous parts while for the go path, odd reference numbers have generally been used, the immediately higher even numbers having been chosen for their counterparts in the return path.

The regulating system of FIG. 1 can be divided into two parts, each comprising a transmission channel 1, 2 respectively (here shown to be of opposite directions) of which only one regulating section has been represented, as well as associated circuitry described hereafter. The transmission channels 1, 2 are each provided with a pilot wave generator or a pilot injecting circuit 3, 4 at a transmitting end of these channels; means 5, 6 for regulating the transmission on these channels in slave stations distributed along each transmission channel 1, 2 and a control channel, or more precisely a return remote control channel 7, 8 connecting a receiving control station 9, 10 of channels 1, 2 respectively to the regulating means 5, 6 of these channels. Each of the controlling stations 9, 10 respectively comprises means 11, 12 to extract the transmitted pilot wave, means 13, 14 to measure the level of the pilot wave at the receiving control station and to convert the measured level, and a comparator 15, 16 all arranged in series. The other input of the comparator 15, 16 respectively, is connected to a standard 17, 18 while the output of comparator 15, 16 transmits the difference signal resulting from the comparison of the received level with the standard level to means 19, 20 converting this difference into a remote control signal. The control signal issuing from each of the means 19, 20 is transmitted to the respective regulating means 5, 6 over the remote control channels 7, 8, the bypath 21, 22 and the conversion means 23, 24 respectively.

The control channels 7, 8 comprise means 25 and 29, 26 and 30 to derive the control signal from at least one other control channel 8, 7 and means 27, 28 sensitive to the failure of a control signal and able to command the above derivation. Means 25 and 29, 26 and 30 respectively are constituted by the links 25, 26 and by switching means 29, 30 inserted in the bypaths 21, 22 of the control channels 7, 8 associated with the transmission channels 1, 2, the links 25, 26 connecting the switching means 29, 30 to another control channel 8, 7 respectively.

Due to this, the detection of a failure, e.g. the attenuation below a predetermined minimum level of a control signal at any point of a control channel, entails the switching of the regulating means which cease to be controlled by the remote control channel affected to their transmission channel, onto the remote control channel of the other transmission channel. The regulation of these regulating means is thus made blind, i.e. by having recourse to control signals which were not normally destined for these regulating means. This practice is quite satisfactory as a stand-by working condition where the transmission channels so associated present characteristics and are subject to disturbance which are substantially alike. When the failure affects only part of the regulating means of the transmission channel, as is the case in FIG. 1 for a failure occurring at point 31 of the control channel 7, the regulating means not affected by this failure, that is to say the regulating means not shown) similar to 5 and which are located between the regulating means 5 shown and the receiving station 9, compensate the deviations introduced by a blind regulation of the regulating means assisted by the other control circuit 8. Hence, the system described enables to provisionally remedy a failure of the control signal of a transmission channel by extracting the signal of another control channel, and applying it to the regulating means of this transmission channel.

FIG. 2 illustrates a particularly advantageous embodiment for a system which does not comprise control channels physically distinct from the transmission channels. The transmission channels 1 and 2, of opposite directions, reciprocally provide the control channel for the other transmission channel. For the remaining part of the system, the arrangement and the operation are identical to those shown and described in connection with FIG. 1. In view of the disappearance in FIG. 2 of the physically distinct remote control links 7, 8, the changeover contacts 29, 30 which normally are in the position *a* shown, under the control of the detecting means 27, 28, detecting control signals of appropriate amplitude at the output of the control signal extracting devices 12′, 11′ (which are analogous to the pilot extracting means 11, 12 provided at the end of the transmission channels 1, 2) will switch over to the stand-by position *b* in case of such a device as 27 for instance detecting an inadequate signal. In that case, blind regulation would then be carried out as in FIG. 1, in the conversion means 23 being now connected to the output of the device 11″ which filters out the control signal injected on channel 1 by the conversion means 20. A like device 12″ is provided for the recovery of the remote control signal injected on channel 2 by the conversion device 19.

In the system of FIG. 2, the control signal will advantageously be constituted by a signal of variable frequency and not by a signal of variable amplitude. In other words, the conversion means 19, 20 will be arranged so as to provide a signal of variable frequency at their outputs, its frequency depending on the amplitude of the corresponding regulating pilot signals of fixed frequency extracted by the filters 11, 12. The frequency range for the variable frequency control signals provided at the outputs of 19 and 20 will be selected outside the frequency band or bands occupied by the useful signals transmitted on transmission channels 1 and 2. This form of realization is particularly suitable in transmission systems of the 4-wire type.

In this manner, the level of the remote control signals no longer constitutes the regulating information and switching over of the controls in the case of a failure thus depends from a parameter, i.e. the amplitude of the signal, which is not the variable parameter used to control the regulating means. Amplitude modulation being thus excluded for that purpose, variations of level solely control the failure detecting means 27, 28.

It should be noted that although FIG. 2 illustrates a system where the amplifiers 5 and 6, of which only one is shown in each transmission channel, although there will in general be a plurality of such repeaters in tandem, are located in different slave stations, this is not essential. If the repeaters 5 and 6 are in the same slave station and thus topographically coincident, the remote control signal extracting means such as 11″ and 12″ are no longer necessary and instead, the outputs of 11′ and 12′ may then be connected to the *b* contacts of switching means 29 and 30 respectively.

FIG. 3 shows an arrangement offering similarities with that of FIG. 2 in the sense that again, the control channels are not physically distinct from the transmission channels as was the case in FIG. 1. The arrangement of FIG. 3 of which many elements are similar to those of FIG. 2 as well as those of FIG. 1 and are accordingly indicated by the same reference numerals, is distinguished by the fact that a predetermined frequency is added to the variable frequency control signal.

These fixed frequencies are generated by the generators 33, 34 which have their outputs connected in parallel with those of the conversion means 19, 20 delivering the variable frequency control signals. If, for instance, a 12 mc./s. coaxial cable carrier frequency transmission system is considered, of which the lower limit of the transmitted frequency band is 300 kc./s., the amplifiers 5, 6 and the equalizers (not shown) inserted in these coaxials transmission channels 1, 2 will ensure that between 200 and 300 kc./s. for instance, the attenuation of the coaxial pairs is still suitably compensated. Since frequency now constitutes the variable parameter of the control signals and thus carries the control information, one may on the other hand be less exacting in what concerns the stability of the transmission equivalent in this frequency band located immediately below the useful frequency band of the coaxial system.

If it is assumed that the remote control signal provided at the outputs of 19, 20 has a frequency $f$ varying between 200 and 220 kc./s., its average frequency is thus $f_o$=210 kc./s. and in this case, the predetermined frequency signal provided by 33, 34 may for instance have a frequency of 225 kc./s., i.e. a frequency located above the band allocated to the control signal.

In each slave station such as that comprising the repeaters 5, 6 of FIG. 3, means 12′, 11′ to extract the variable frequency control signal as well as the signal with predetermined frequency are provided. At the output of 12′, 11′ signals of 225 kc./s. and of frequency $f$ varying between 200 and 220 kc./s. are led to devices 35, 36 each of which comprises a non-linear device followed by a filter in order to extract the difference frequency between the fixed frequency of 225 kc./s. and the variable frequency $f$. At the output of 35, 36 the signal frequency thus varies between 5 and 25 kc./s. and as the range of variation in frequency $f_d$ is still equal to 20 kc./s., while the mean frequency $f_o$ has been brought down from 210 to 15 kc./s., the factor $f_d/f_o$ is multiplied by 14, which constitutes a very substantial improvement.

Signals appearing at the outputs of 35, 36 are led on the one hand to switching means 29, 30 and on the other hand to level detecting devices 27, 28 which are sensitive to the failure of these frequency translated control signals. By failure one can in principle understand too low an amplitude as well as an abnormally high value. At the output of switching means 29, 30 and in their normal position, as represented in FIG. 3, signals coming from 35, 36 are also led to the respective limiters 37, 38 which immediately precede the frequency discriminators 39, 40. At the output of these frequency discriminators or frequency counters 39, 40 a voltage is thus found the amplitude of which again characterizes the state or the transmission equivalent of the channel, i.e. 1, 2, which must be controlled. These variable amplitude signals are then taken to means 41, 42 directly controlling in well-known manner the characteristics of the repeaters 5, 6. The whole of the elements 37/39/41, 38/40/42 of FIG. 3 thus respectively corresponds to elements 23, 24 of FIGS. 1 and 2.

The drawing indicates that the signals coming from the frequency translating devices 35, 36 pass to the limiters 37, 38 through electro-mechanical or electronic change-over contacts 29, 30 represented in their normal *a* position. These normal *a* positions are obtained as long as the detecting means 27, 28 detect signals of acceptable amplitude at the outputs of 35, 36.

If this is no longer the case at the output of 35 for instance, the change-over contact 29 passes from the indicated normal *a* position to the stand-by *b* position, so that the limiter 37 is now fed by the output of the device 36 instead of 35. In this way, one may continue to control the transmission channel 1 with a sufficient approximation if the channels 1, 2 present substantially the same characteristics and are also subjected to substantially equal disturbances.

If the fixed frequency F provided by 33, 34 is not ideally constant but varies between $F \pm F_d$, regulation shall not be affected thereby, as such a deviation will be automatically compensated by the system which keeps all its accuracy. It is solely necessary that the conversion means 19, 20, the remote control channels and the signal extracting means 12′, 11′ should be able to produce frequencies from $f_m - F_d$ to $f_M + F_d$, transmit the frequency band so defined, as well as $F \pm F_d$, and extract these frequencies respectively. The manufacturer will strive for a limitation of the deviation $F_d$ but will thus foresee the necessary tolerances.

Apart from frequency translation at the slave stations, in the direction allowing an increase of the ratio $f_d/f_o$, frequency translations at the receiving control stations 9, 10 may of course be used before injecting the variable frequency signal. Frequency divisions and multiplications, which leave this ratio unchanged, are also possible. Frequency division before signal injection on the remote control channel reduces the bandwidth and an eventual multiplication in a slave station does not necessitate the local generation of an auxiliary waveform.

The control of the repeaters 5, 6 may of course be of any suitable type, either analogue or digital.

It will be noticed that the described system introduces a possibility of coupling between the transmission channels by the use of each of these for the transmission of the remote control signals of the other channel, as well as by the switching devices which it introduces. However, this coupling occurs at low frequencies very remote from the useful frequencies, and filters such as those comprised in 12′ and 35 on the one hand, and 11′ and 36 on the other hand, are inserted in the path between a transmission channel and that which is associated thereto, thus facilitating the solution of crosstalk problems.

Of course, the number of channels 1, 2 is not limited to two, each of them may comprise an arbitrary number of regulating sections arranged end-to-end, and the regulating means 5 (6), the control signal extracting means such as 29 (30) and the means 27 (28) sensitive to failures of the control signal must not exclusively be foreseen in intermediate stations but may also be arranged at the transmitting or receiving stations. Means 11, 12; 13, 14; 15, 16; 17, 18; 19, 20 and 33, 34 must no longer be duplicated since those established at the controlling station 9 constitute the duplication of those established at the controlling station 10 and vice versa, in which case however it is advisable to provide certain elements of the stations 9, 10 with a memory device, e.g. the conversion means 19, 20. One may take advantage of these memory devices to set the regulation, i.e. keep it at the value attained, in case of sudden level changes of the received pilot wave. In this case it would be appropriate to have slow regulation, e.g. a motor driven capacitor. The regulation might also be set upon a predetermined regulation limit being reached.

Moreover, the transmission channels may have the same direction or not. However, for the cases illustrated in FIGS. 2 and 3, at least one channel must be in the opposite direction with respect to the others so as to secure the remote control return channel for these transmission channels.

Though the system is particularly advantageous in the case of remote control, as it is clear that its principal aim is to obviate the loss of reliability which may result from the use of a remote control circuit distinct from the controlled transmission channel, some of the principles may be successfully used in systems without remote control.

While the principles of the invention have been described above in connection with specific apparatus, it is to be clearly understood that this description is made only by way of example and not as a limitation of the scope of the invention.

I claim:

1. An automatic regulating system for at least two transmission channels presenting substantially equal characteristics and subjected to substantially equal disturbances, over which separate regulating pilot signals are transmitted and converted at a receiving station into separate variable frequency control signals to command separate regulating means so as to control the state of each of said transmission channels, comprising detection means in each channel provided to detect a failure of the control signals when the control signals go out of a fixed predetermined range of level values, switch-over means controlled by said detection means, said switch-over means responding to commands from the detection means to switch over control of a channel having faulty control signals, whereby said channel may be controlled by control signals from an alternate channel, and frequency translating means coupled to receive said variable frequency control signals and to command said regulating means, said regulating means including means for extracting control signals from at least two control channels and including a failure detection means for the control signals normally allotted to said regulating means.

2. An automatic regulating system as claimed in claim 1, in which a signal of predetermined frequency is used to modulate the variable frequency control signal.

3. An automatic regulating system as claimed in claim 2, in which the signal of predetermined frequency is located outside the frequency range of the variable frequency control signal.

4. An automatic regulating system as claimed in claim 3, in which the frequency translating means are constituted by non-linear elements producing the difference frequency between the predetermined frequency and the variable frequency without a local carrier.

5. An automatic regulating system as claimed in claim 4, in which said output signal of the frequency translating means is applied to a frequency discriminator preceded by an amplitude limiter, the frequency discriminator providing the signal for the command of the regulating means and to the failure detecting means which are connected to pick up said output signal before said limiter in order to determine whether a failure has occurred.

6. An automatic regulating system as claimed in claim 1, in which at least one control channel is common to the regulating means of several transmission channels.

7. An automatic regulating system as claimed in claim 6, in which at least one transmission channel and at least one control channel are physically coincident.

8. An automatic regulating system as claimed in claim 7, in which at least one transmission channel physically coincides with the control channel for the regulating means of this transmission channel.

9. An automatic regulating system as claimed in claim 8, in which a transmission channel physically coincides with at least one control channel for the regulating means of another transmission channel.

10. An automatic regulating system as claimed in claim 9, in which at least two transmission channels are of opposite directions.

11. An automatic regulating system as claimed in claim 10, in which conversion means are located in a receiving station at the end of a regulation section to provide said control signals from the received regulating pilot signals.

12. An automatic regulating system as claimed in claim 11, in which memory devices are coupled to said conversion means.

References Cited

UNITED STATES PATENTS 1,927,989 9/1933 Nyquist.

2,350,951 6/1944 Zinn.
1,927,989 9/1933 Nyquist ----------- 179—170
2,350,951 6/1944 Zinn --------------- 178—63
2,686,256 8/1954 Albersheim ---------- 250—6
2,254,205 9/1941 Bollman ------------- 333—2

KATHLEEN H. CLAFFY, Primary Examiner

W. A. HELVESTINE, Assistant Examiner

U.S. Cl. X.R.

178—63, 70; 179—170, 170.4; 333—16